United States Patent

[11] 3,610,451

[72] Inventor Ronald Bevan
   Welwyn Garden City, England
[21] Appl. No. 32,154
[22] Filed Apr. 27, 1970
[45] Patented Oct. 5, 1971
[73] Assignee Imperial Chemical Industries Limited
   London, England
[32] Priority May 7, 1969
[33] Great Britain
[31] 23377-69

[54] SHEET HANDLING
   3 Claims, 10 Drawing Figs.
[52] U.S. Cl. .................................................. 214/152,
   214/8.5 R
[51] Int. Cl. ...................................................... B65g 60/00

[50] Field of Search ......................................... 214/8.5 R,
   152, 15; 100/196, 199, 202

[56] References Cited
   UNITED STATES PATENTS
   3,289,860  12/1966  Dean .............................  214/8.5
   FOREIGN PATENTS
   1,182,795  10/1962  Germany .....................  100/199

Primary Examiner—Gerald M. Forlenza
Assistant Examiner—George F. Abraham
Attorney—Cushman, Darby & Cushman ABSTRACT: Apparatus and a method for dismantling and reassembling cells, e.g., for press loads in which the sheets are pivoted about one side to expose workpieces which are then removed, and fresh workpieces are inserted in their place on lowering of the sheets.

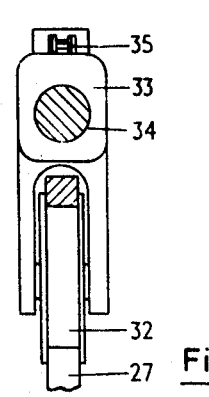
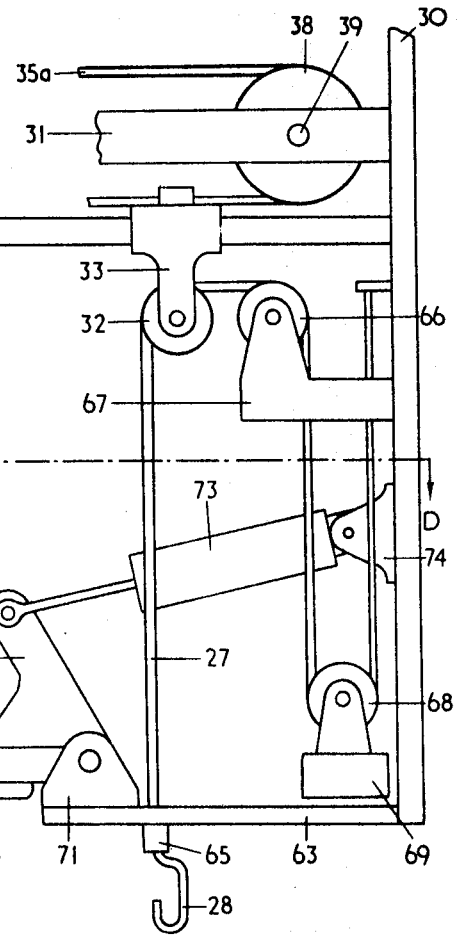
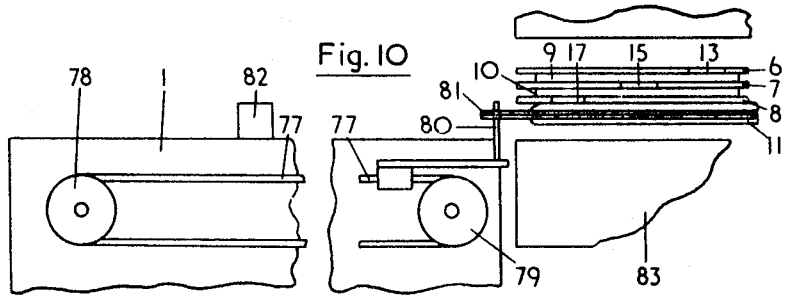

SHEET HANDLING

This invention relates to sheet handling and in particular to a method and apparatus for assembling and dismantling cells of a plurality of sheets which are to be subjected to a further process, for example a pressing operation, so that the workpieces, i.e., the materials being processed can be removed from a "processed" cell and replaced by new workpieces in assembling a cell for processing.

By the term "cell" we mean a sandwich of a plurality of sheets, between at least some of which are interposed layers of the material to be processed.

As used hereinafter, the layers of the material to be processed are termed "workpieces" and a cell that has been subjected to the further processing operation is termed a "processed cell" which therefore contains "processed" workpieces. Likewise workpieces that have not yet been processed are termed "fresh" workpieces.

In the production of laminated sheet articles such as plywood, or, particularly, laminated plastic sheets, a plurality of layers constituting the workpieces, e.g., thin wooden sheets to make plywood or plastic foils to make a laminated plastic sheet, are superimposed and are subjected to a pressing operation normally while being subjected to heat.

These foils or thin sheets constituting the workpiece are normally placed between a pair of metal plates, termed press plates and, in order to compensate for small thickness variation in the press plates, a resilient layer such as a wad of paper is placed between the press plates and a further pair of metal sheets termed backing plates. The cell consisting of, in order: backing plate, resilient layer, press plate, workpiece, press plate, resilient layer, and backing plate, is then placed between the plates of a press and is subjected to elevated pressure and temperature to effect lamination of the workpiece.

It is therefore seen that one important step in the production cycle is the assembly and dismantling of the cells. Heretofore these operations have been performed by hand but as the components of the cell, particularly the press plates and backing plates, are often cumbersome and heavy, considerable labor has been expended on their handling.

We have now devised a method and apparatus for assisting the dismantling and assembly of the cells.

Accordingly, we provide a method of dismantling and assembling cells consisting of plurality of sheets or platelike components comprising:
  i. positioning a processed cell horizontally on a bed,
  ii. pivoting the uppermost sheet or sheets of the cell by lifting one side of the sheet to an angle of less than 90° to the horizontal,
  iii. holding said sheet or sheets in the pivoted position,
  iv. removing any processed workpieces or components of the cell, which are to be replaced, that are exposed as the top layer of the remains of the cell on the bed,
  v. pivoting the next sheet or sheets and subsequent sheet or sheets of the cell in turn in like manner, but to smaller angles to the horizontal, removing any components of the cell, which are to be replaced as they become exposed, until the exposed component of the cell remaining on the bed is the lowest one which is to be replaced,
  vi. replacing said exposed component by a fresh component and,
  vii. lowering the raised sheet or sheets in turn on to the bed, inserting fresh cell components between the sheets from which cell components had been removed.

We also provide apparatus for use in assembling and dismantling cells consisting of a plurality of sheets or platelike components comprising:
  i. a bed on to which a cell may be placed horizontally for dismantling.
  ii. a plurality of pivoting means each comprising:
    a. a stop against which one side of a sheet of the cell may pivot and
    b. lifting means for raising and lowering the opposite side of the sheet of the cell and
    iii. holding means for holding sheets pivoted by said pivoting means at angles of less than 90° to the horizontal.

The application of the method and apparatus is now described in relation to a typical cell used in a pressing operation and consisting of, in order:
  a backing plate (i)
  a wad of paper (ii) constituting a resilient layer
  a press plate (iii)
  a workpiece (iv) consisting of a plurality of plastic foils
  a press plate (v)
  a workpiece (vi) consisting of a plurality of plastic foils
  a press plate (vii)
  a wad of paper (viii) constituting a resilient layer and
  a backing plate (ix)

The cell is placed horizontally on a bed and the backing plate (i) is pivoted about one side by lifting the opposite side, said one side engaging with a stop to prevent sideways movement. The backing plate (i) is pivoted through about 80° and held there. The wad of paper (ii) is thereby exposed as the top components of the remains of the cell and is removed. Press plate (iii) is then pivoted in the same manner as backing plate (i), but through only about 74°. The workpiece (iv) that has been pressed is thus exposed and is removed. Press plate (v) is then pivoted, but only through about 68°, thereby exposing the second pressed workpiece (vi) which is then removed. Press plate (vii) is then pivoted, but through about 62°, exposing the wad of paper (viii). As this is the lowest component of the cell that is to be replaced, wad (viii) is removed and replaced by a fresh wad of paper. Press plate (vii) is lowered on to the fresh wad of paper and a fresh set of foils are placed on top of plate (vii) so as to constitute the new workpiece (vi). Press plate (v) is lowered, followed by the insertion of a fresh set of foils to constitute new workpiece (iv). Press plate (iii) is lowered on to the new workpiece (iv) and a new wad of paper is placed on plate (iii). Finally backing plate (i) is lowered on to the new wad of paper.

It will be appreciated that the above procedure can be adapted for any number of workpieces. Also, it may not be necessary to renew the wad of paper after each pressing operation. In that case in a cycle where such a replacement is unnecessary, backing plate (i), wad (ii) and plate (iii) can be raised and lowered as a single unit, and likewise when workpiece (vi) is exposed, it can be replaced by a fresh workpiece and then press plate (v) is lowered.

In some cases the number of cell components can be reduced, for example by replacing the backing plates and the resilient wad of paper by, for example, a cushion plate of the type described in our Belgian Pat. No. 724 136. Since this cushion plate will not require replacement, the cushion plate and the press plate immediately beneath can be pivoted as a single unit, except where the press plate requires replacement, for example if it becomes scratched. Also it may only be necessary to provide one cushion plate per cell.

The workpieces and the wads of paper, where used, can be removed mechanically or manually.

The angle through which the cell components are raised depends on the number of components that have to be raised as it is preferred, in order to avoid scratching, to have them held spaced apart when in the raised position. Generally it is to be desired that an angle of 3° to 10° is left between any two pivoted components. If the angle through which they are raised exceeds 90° then more complicated raising and lowering devices are required and more floor space is utilized by the apparatus. The minimum angle through which the components are pivoted depends on what clearance is required for removal and insertion of workpieces and any other components of the cell that have to be replaced.

To provide additional clearance space and also to avoid damage to the cell components, it is preferred to lift both sides of the sheet from the cell by a small amount before pivoting the sheet about one side. Alternatively, where the sheet is to pivot about one side, that side may be raised a small amount from the rest of the cell by, for example, the stop against which the sheet pivots, before the opposite side of the sheet is lifted.

One method of lifting the sheets to pivot them is by the use of hooks suspended by a rope or wire or, preferably, a chain from an overhead beam, the hooks engaging in lugs on the sheets. The hooks are then hoisted up when it is desired to pivot the sheet.

One embodiment of the invention is illustrated by the accompanying drawings wherein:

FIG. 6 is a section on the line B—B of FIG. 1 of the slider and sprocket and of the lifting device.

FIG. 8 is a side elevation of an alternative, preferred, lifting device and a safety device.

FIG. 10 is a diagrammatic elevation of the drive for transporting a cell to and from a press.

Figure 1:
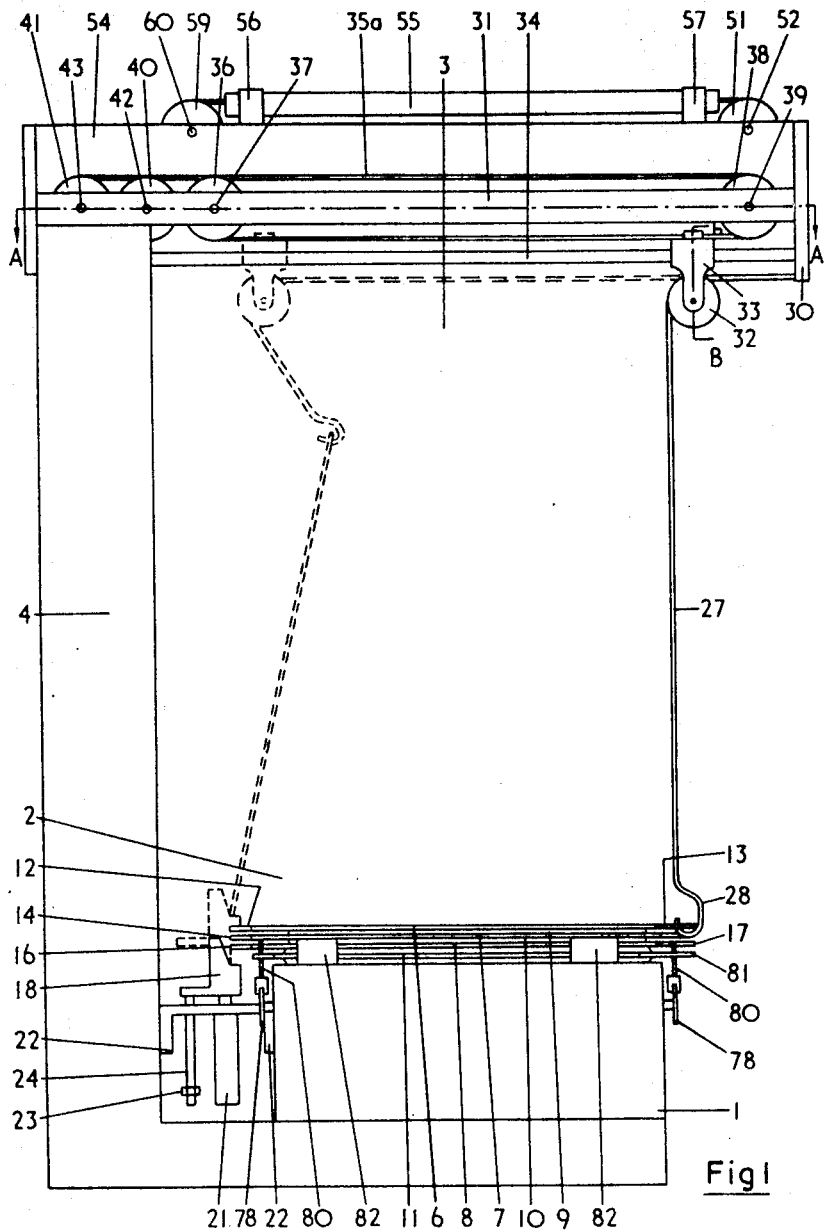
FIG. 1 is a side elevation of the apparatus.

The general arrangement of the apparatus is shown in FIG. 1. In general terms it consists of a bed 1 on to which a cell may be placed, a pivoting arrangement generally indicated by reference numeral 2, and a lifting arrangement generally indicated by reference numeral 3. The lifting arrangement 3 is supported above bed 1 by means of a frame 4.

The bed 1 is provided with a flat horizontal upper surface 5 (see FIG. 2) measuring about 2.5×1.5 meters, on to which a cell can be placed. In FIG. 1 the cell is shown consisting of three rectangular plates 6, 7, and 8 having workpieces 9, 10 interposed therebetween. Plate 8 rests on top of a cushion plate 11 of the type shown in FIG. 3 of our Belgian Pat. No. 724 136 and consisting of a pair of thin metal sheets welded together round their periphery and filled with ethylene glycol.

As shown in FIGS. 1 to 4 each of plates 6, 7 and 8 is provided with a pair of lugs on each of the longer edges of the plate. The lugs along one edge of the uppermost plate 6 are indicated by numerals 12 while those on the opposite edge are indicated by numerals 13. The corresponding lugs on plates 7 and 8 are indicated by numerals 14, 15, and 16 and 17 respectively.

Lugs 12, 14 and 16 are used in conjunction with the pivoting mechanism 2 while lugs 12, 15 and 17, which each have holes drilled therein to which hooks can be attached, are used in conjunction with the lifting mechanism 3.

Figure 3:
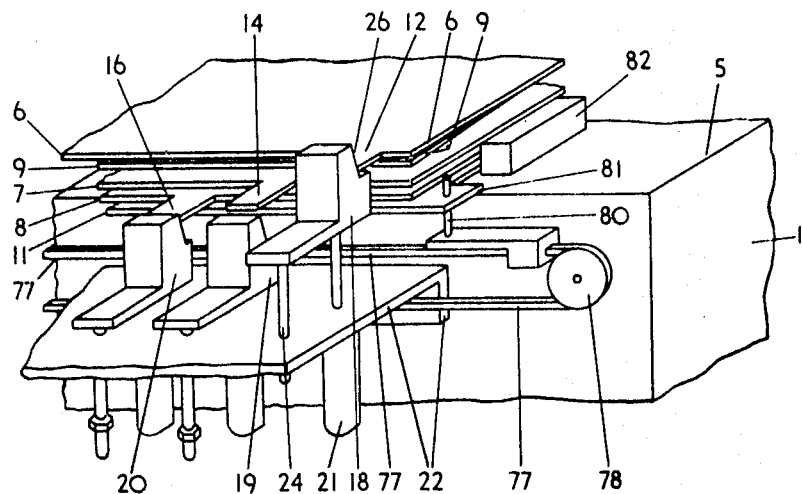
FIG. 3 is an enlarged perspective view of the pivoting mechanism and the plates.
Figure 4:
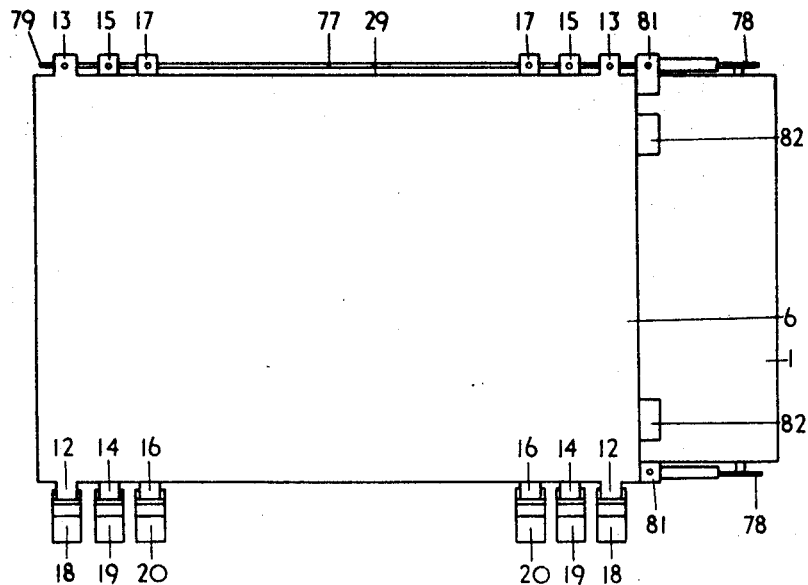
FIG. 4 is a plan of a cell located on the bed.

The lugs 12, 14 and 16, are staggered with respect to one another as shown in FIGS. 3 and 4. Likewise, the lugs 13, 15 and 17 are also staggered with respect to one another.

The pivoting mechanism 2 consists of a series of stops 18, 19 20 each of which has an associated pneumatic or hydraulic cylinder 21, which serves to raise or lower its associated stop. One stop is provided for each of lugs 12, 14 and 16. The cylinders 21 are supported by a bracket 22 mounted between frame 4 and bed 1. The stroke of each stop is limited by means of a preset nut 23 on a threaded rod 24 which projects from the stop through bracket 22.

Each stop has a flat surface 25 which can engage with the under surface of the associated lug, and an inclined surface 26 against which the end of the associated lug can pivot.

The surfaces 26 are inclined so that clearance is provided between the stop and its corresponding lug during raising of the stop and so that, when the stop is in the raised position the end of the associated lug abuts against surface 26 so that lateral slipping and scuffing of the associated cell component is minimized.

In the lowered position the surfaces 25 of the stops are just below the upper surface 5 of bed 1, so that the cell can be placed on the surface 5 without hindrance from the stops.

Figure 2:
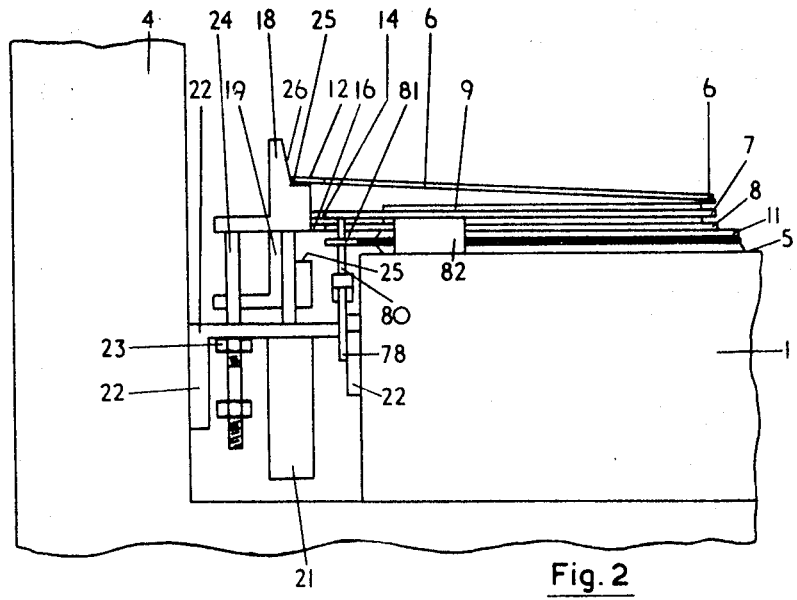
FIG. 2 is an enlarged elevation of the pivoting mechanism and the plates.

Stops 18, which lift the lugs 12, have the longest stroke. They serve to assist parting of plate 6 from the workpiece 9, and also to minimize scuffing of the workpiece 9 on pivoting plate 6. The stop 18 in the raised position is shown in FIGS. 2 and 3 and in this position in broken lines in FIG. 1.

Stops 19 have an intermediate stroke, lifting their associated lugs 14 to an extent sufficient to assist parting and to minimize scuffing, but such that, on pivoting the plate 7, after plate 6 has been lifted and pivoted, plates 6 and 7 do not contact each other. Likewise, stops 20, which have the shortest stroke, lift lugs 16 to minimize scuffing of plate 8 on cushion plate 11 but to an amount such that, on pivoting plate 8 after plates 6 and 7 have been lifted and pivoted, plates 7 and 8 do not contact each other. Generally it will only be necessary to pivot plate 8 when it is desired to replace or clean cushion plate 11. Thus normally stops 20 are not used.

The plates 6, 7 and 8 (if desired) are pivoted by lifting the edges having lugs 13, 15 and 17 respectively. The plates are lifted by means of a series of chains 27 each of which carries a hook 28 which engages with the hole in the associated lug.

In operation, hooks 28 are attached to the lugs 13 of plate 6 and then the lugs 12 of plate 6 are lifted, as hereinbefore described, by stops 18.

Hooks 28 are then raised as will be hereinafter described. This first causes the edge 29 of plate 6 to be lifted clear of workpiece 9. Because the plates 6, 7 and 8 are relatively thin (their thickness is shown exaggerated in the drawings for clarity), they are somewhat flexible and so initially the plate 6 is merely bowed. However as hooks 28 are lifted further, all of plate 6 is separated from workpiece 9 and pivots, lugs 12 engaging with the inclined surfaces 26 and flat surfaces 25 of stops 18. Plate 6 is lifted until it makes an angle of about 75° to the horizontal.

Workpiece 9 is then removed by, for example, a suction-cup sheet-handling machine, (not shown), which lifts the workpiece 9 and carries it from the cell. Then a second set of hooks 28 are engaged with lugs 15 of plate 7, and stops 19 are then raised to lift lugs 14 of plate 7. Plate 7 is pivoted in the same way as plate 6 but only to an angle of about 65° to the horizontal.

Workpiece 10 is then removed in like manner to workpiece 9.

As mentioned hereinbefore, generally, with a cell of this type it will not be necessary to raise and pivot plate 8 since nothing has to be removed from between plate 8 and cushion plate 11. However, should it prove necessary, then plate 8 is raised in a similar manner to plates 6 and 7 but pivoted to a smaller amount.

The lifting mechanism 3 consists of a series of chains 27 carrying hooks 28 which engage in lugs in the plates to be pivoted.

Figure 5:
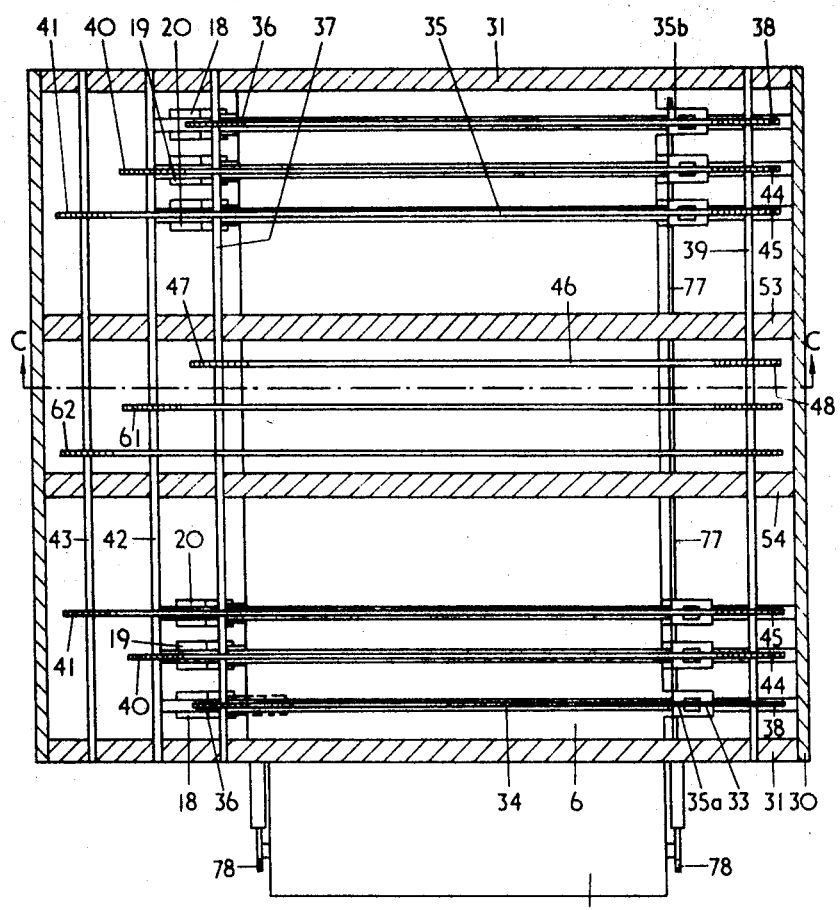
FIG. 5 is a cross section of A—A of FIG. 1.

In the embodiment shown in FIGS. 1 and 5 the chains 27 are of fixed length, fastened at one end to a longitudinal extending member 30 which is attached to a transverse member 31 supported by the upright supporting frame 4.

Each hook 28 is raised by pulling a sprocket 32 horizontally away from longitudinal member 30. Sprocket 32 is mounted on a runner 33 which slides along a rod 34 fastened between the upright frame 4 and longitudinal member 30. A runner 33 is shown in more detail in FIG. 6.

The positions of sheet 6, and its associated hook 28, chain 27, sprocket 32 and runner 33 in the "plate-pivoted" position is shown in broken lines in FIGS. 1 and 5.

The runners 33 are attached to chain drives 35. The chain drives 35a and 35b (see FIG. 5) for the runners associated with the wires 27 that are used to lift plate 6 are driven by sprockets 36 fixed to axle 37 journaled in the horizontal transverse members 31 and idle on sprockets 38 which rotate freely on axle 39 also journaled in the horizontal transverse members 31 (see FIGS. 1 and 5).

Similarly the chain drives for the wires that are used to lift plates 7 and 8 are respectively driven by sprockets 40 and 41 fixed to axles 42 and 43 respectively also journaled in horizontal transverse members 31. These chain drives respectively idle on sprockets 44 and 45 which rotate freely on axle 39.

Figure 7:
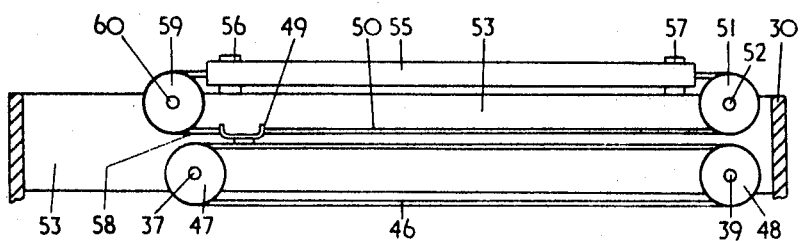
FIG. 7 is a cross section on C—C of FIG. 5 of the lifting mechanism of the apparatus.

Axle 37 is driven by a chain drive 46 round a sprocket 47 fixed to axle 37 and which idles round sprocket 48 freely mounted on axle 39. (See FIG. 7). Chain drive 46 carries a bracket 49 which is moved to drive chain 46. To one side of bracket 49 a cord 50 is attached. Cord 50 passes round a pulley 51 freely mounted on an axle 52 journaled between two transverse members 53 and 54 attached to longitudinally extending member 30 and frame 4. Cord 50 is attached to one side of a piston situated inside pneumatic cylinder 55 mounted between transverse members 53 and 54 by brackets 56 and 57. The other side of the piston inside cylinder 55 is attached to a cord 58 which passes round a pulley 59 idling on an axle 60 journaled between transverse members 53 and 54. The free end of cord 58 is attached to the other side of bracket 49 on chain 46.

Thus by driving the piston in cylinder 55 to-and-fro pneumatically, bracket 49 is moved thereby driving chain 46 and hence rotating axle 37 which in turn drives chains 35a and 35b, thus causing movement of sliders 33 to raise or lower the hooks 28 used to pivot sheet 6.

Axles 42 and 43 driving the chain drivers to raise or lower hooks 28 used to pivot sheets 7 and 8 respectively are driven in like manner to axle 37 by chain drives operating sprockets 61 and 62 respectively.

When the runners 33 are near to longitudinal member 30 the hooks merely hang in a position suitable to be fastened to the lugs 13, 15 and 17 of plates 6, 7 and 8, respectively.

This can be a nuisance as the hooks and chains may become tangled, obstruct removal and insertion of workpieces to the cell on bed 1, and may also impede movement of the cell to and from an associated press. In order to overcome these difficulties, we prefer that the hooks are held in a raised position ready for use so that they can be pulled downwards, against a small spring bias or load, by an operator when it is desired to hook the chain on to the lug of a plate of a cell on the bed.

A preferred arrangement for doing this is shown in FIG. 8.

Figure 9:
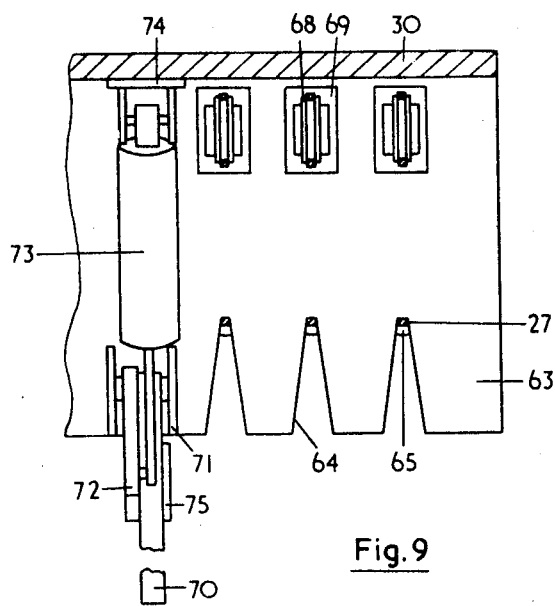
FIG. 9 is part of a cross section on D—D of FIG. 8.

Here longitudinal member 30 shown in the previous FIGS. 1 and 5 is extended vertically downwards and has an inwardly extending plate 63 fastened horizontally to its lower edge. Plate 63 is provided with a series of slots 64 as shown in FIG. 9, through one of which each chain 27 passes. A stop 65 is fastened on each chain just above or as part of hook 28 so that plate 63 can provide a limit to the upward travel of hook 28.

Instead of chain 27 being fastened directly to longitudinal member 30 after passing over sprocket 32, a second sprocket 66 journaled freely on an axle mounted on a bracket 67 extending inwardly from longitudinal member 30 is interposed, together with a third sprocket 68 to which is attached a weight 69.

Thus on pulling hook 28 downwards, weight 69 is raised until it abuts against the underside of bracket 67.

Then, on drawing runner 33 away from member 30 when pivoting a plate fastened by its lugs to hooks 28, hook 28 is raised since weight 69 abuts against the underside of bracket 67. Of course, weight 69 must not be such that the force exerted by the two weights 69 attached to the chains 27 fastened by the hooks 28 to the two lugs of any plate exceeds the force required to pivot the plate or to hold it in the pivoted position.

Also shown in FIG. 8 is a preferred safety device to prevent accidental lowering of raised plates, thereby endangering an operator who might have extended one or more portions of his body over the bed 1.

This safety device consists of a lever 70 pivotally mounted on a bracket 71 fastened on plate 63. Also pivotally mounted on the same axis is a crank 72. On arm of crank 72 is attached to a piston slideably mounted in a cylinder 73 attached to longitudinal member 30 by a bracket 74. The piston is driven hydraulically in cylinder 73. Crank 72 is provided with a projection 75 upon which the lever 70 is supported. Thus lever 70 can freely move upwards and so can permit a plate, such as that shown in broken lines and designated by reference numeral 76, to be raised. However, should the mechanism holding plate 76 in the pivoted position fail, plate 76 can only drop until it abuts against lever 70. If plate 76 is to be lowered, hydraulic cylinder 73 must first be operated to rotate crank 72 clockwise thereby lifting lever 70 clear so that plate 76 can pass below lever 70.

The cell may conveniently be transported from the press to the bed 1 utilizing an air-flotation technique, particularly when the bottom component of the cell is a cushion plate.

The use of air flotation to assist transport of a cell having cushion plates as their bottom members is described in our copending United Kingdom Pat. application No. 61379/68.

So that air flotation can be used, the upper surface 5 of bed 1 is drilled at intervals of 22 cm. to provide holes of diameter 0.5 cm. all over the surface 5 of the bed. A fan (not shown) arranged below the surface 5 of bed 1 blows air through these holes so that an air cushion may be formed to support a cell which is being transferred to and from the press.

Transport of the cell while supported by the air cushion created by the air blown through these holes may be by a pair of chain drives situated along each edge of the bed 1.

One of these is shown diagrammatically in FIG. 10. The chain 77 which is driven by sprocket 78 and idles round sprocket 79 moves a pin 80 along the bed. Pin 80 engages in a hole in a lug 81 on the end of the bottom cell component 11, so that movement of the pin 80 along the length of bed 1 pulls or pushes the cell along. The cell, supported by the air cushion requires relatively little force to effect its longitudinal movement. Stops 82 are provided against which the end of cell component 11 can abut when the cell has reached the desired position on the bed 1. The pins 80 also serve to assist lateral positioning of the cell over the bed. When the cell is in the press, which is immediately adjacent bed 1, the lower platen 83 of the press can raise and lift the cell so that lug 81 is disengaged from pin 80. On completion of the pressing cycle, platen 83 is lowered and lug 81 reengages with pin 80 so that, when the air cushion has been formed by blowing air through the perforations in platen 83 and surface 5, the cell can be pulled out of the press.

I claim:

1. A process for assembling and dismantling cells consisting of a plurality of platelike components comprising:
   i. positioning a processed cell horizontally on a bed,
   ii. pivoting the uppermost sheet or sheets of the cell by lifting one side of the sheet to an angle of less than 90° to the horizontal,
   iii. holding said sheet or sheets in the pivoted position,
   iv. removing any processed workpieces or components of the cell, which are to be replaced, that are exposed as the top layer of the remains of the cell on the bed,
   v. pivoting the next sheet or sheets and subsequent sheet or sheets of the cell in turn in like manner, but to smaller angles to the horizontal, removing any components of the cell, which are to be replaced as they become exposed, until the exposed component of the cell remaining on the bed is the lowest one which is to be replaced,
   vi. replacing said exposed component by a fresh component and
   vii. lowering the raised sheet or sheets in turn on to the bed, inserting fresh cell components between the sheets from which cell components had been removed.

2. A process as claimed in claim 1 wherein that side of the sheet about which the sheet pivots is raised from the cell components beneath the sheet prior to pivoting.

3. A process as claimed in claim 2 wherein both sides of the sheet are raised from the cell components beneath the sheet prior to pivoting.